United States Patent [19]
Buehler

[11] 3,961,714
[45] June 8, 1976

[54] INSTALLATION FOR LOADING A ROAD VEHICLE WITH LOADING UNITS

[75] Inventor: Max Buehler, Thalwil, Switzerland
[73] Assignee: Weelpal AG, Zug, Switzerland
[22] Filed: Mar. 13, 1975
[21] Appl. No.: 557,968

[30] Foreign Application Priority Data
Mar. 15, 1974 Switzerland.................... 003807/74

[52] U.S. Cl. ............... 214/41 R; 214/6 S; 214/38 B
[51] Int. Cl.² ........................................ B65G 67/08
[58] Field of Search ............... 214/6 C, 6 S, 38 B, 214/38 BA, 38 BB, 38 D, 41; 53/26, 77, 159

[56] References Cited
UNITED STATES PATENTS
2,711,835  6/1955  Kappen .............................. 214/38 B
3,780,893  12/1973  Lassig et al. ....................... 214/41 X Primary Examiner—Robert G. Sheridan
Attorney, Agent, or Firm—Abraham A. Saffitz

[57] ABSTRACT

An installation for loading a road vehicle, such as a lorry or a truck with goods stacked on loading units or pallets for delivery at a warehouse exit down an inclined rail track comprising a loading platform on a ramp at the end of a track arranged to receive loading units on more than one track and a conveying means to convey clusters of the loading units into the road vehicle.

13 Claims, 7 Drawing Figures

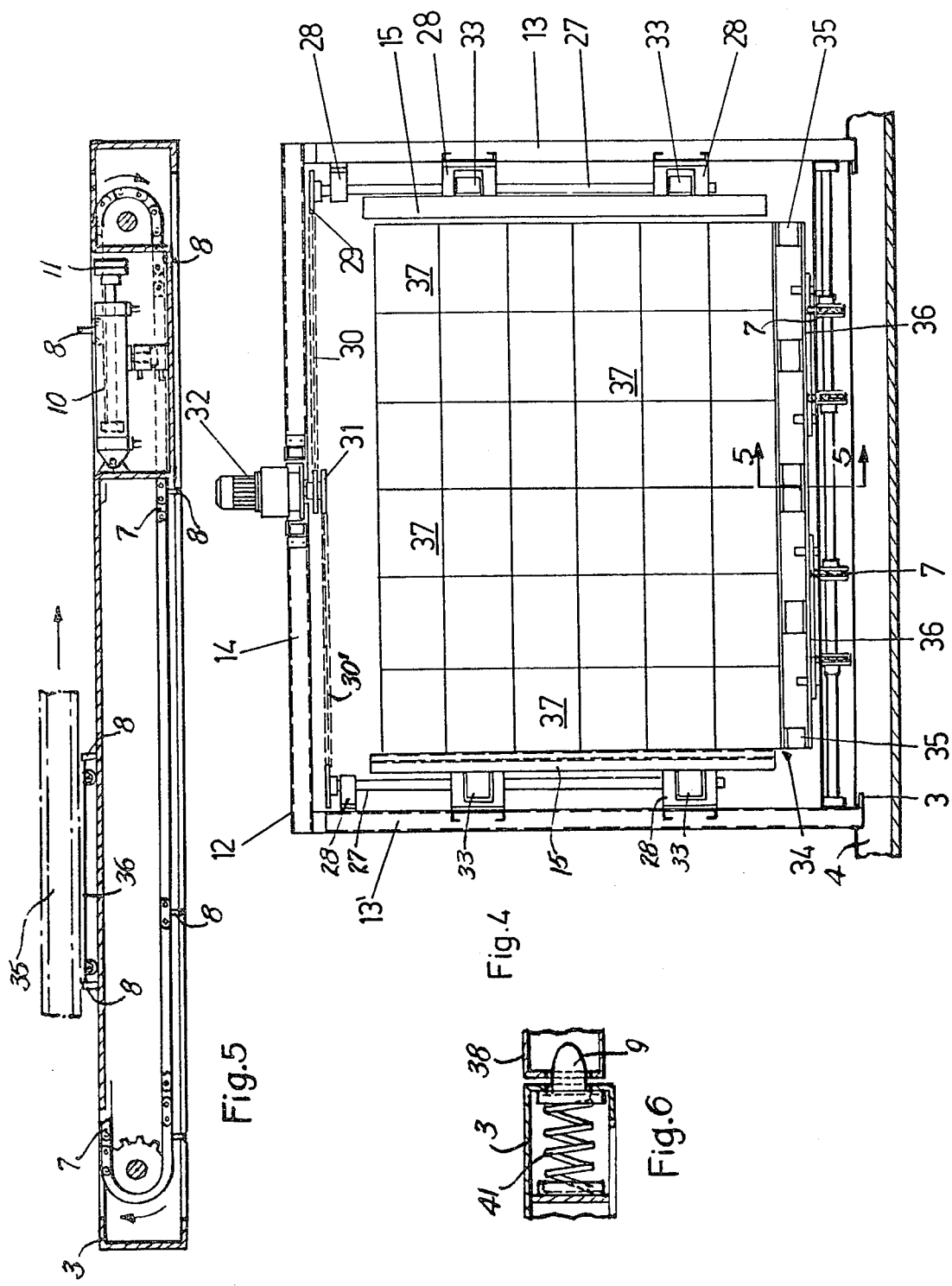

3,961,714

INSTALLATION FOR LOADING A ROAD VEHICLE WITH LOADING UNITS

BACKGROUND OF THE INVENTION

1. Field of the Invention

The present invention relates to an installation for loading a road vehicle such as a lorry or a truck, with goods stacked on loading units, which are ready for delivery at the exit of a warehouse on an inclined rail track.

2. Description of the Prior Art

Road vehicles, especially lorries, play an important role as a link between warehouse and consumer in a process of an exactly calculated flow of goods. It is the lorry which, once loaded, allows an economic and rapid distribution of the goods. However, the most troublesome and time consuming period in this flow of goods is the loading of the lorry.

It is only in loading the lorry that man, in his role as the driver of the lorry, play an important role, while all remaining processes, for instance, storing, registering and arranging the goods, may easily be mechanized in a relatively simple way. Therefore, the driver of the lorry constitutes an unknown factor in an otherwise calculated in-advance operation, the time factor being entirely based upon the driver's facilities and abilities and upon how much time it takes to bring the lorry to an exact position favouring a rapid loading.

OBJECTS OF THE INVENTION

It is an object of the present invention to provide an installation for loading a road vehicle, such as a lorry, which enables a time saving in loading the vehicle with goods stacked on loading units, without the need for exact centering of the lorry relative to the loading site.

It is a further object of the present invention to solve also the problem of handling standard pallets having sideways projecting load pieces, by means of new, efficient and economical apparatus.

SUMMARY OF THE INVENTION

To achieve the above objects, the present invention provides an installation for loading a road vehicle with goods stacked on loading units, which are ready for delivery at the exit of a warehouse on an inclined rail track, comprising:

a. a loading platform provided at the end of said rail track on a loading ramp, said loading platform being displaceably supported on said loading ramp relative to the end of said rail track, b. a number of rail members connecting the end of said rail track to said loading platform, each of said rail members being pivotally connected to the end of said rail track on their one end, while their other end is adapted to rest against the upper surface of said loading platform, c. said rail members being arranged so as to converge from a distance between each other given by the arrangement in the warehouse to a minimal distance given by the width of the loading units, d. said loading platform comprising conveying means for conveying clusters of said loading units from the loading platform into the road vehicle.

Preferably said loading platform is displaceable in the parallel direction as well as the perpendicular direction with respect to the front side of said loading ramp.

Furthermore, said loading platform may comprise means to lift and lower it relative to said loading ramp.

The loading platform may be provided with springy centering studs arranged on the front side of said loading platform facing the front edge of said loading ramp, said centering studs being adapted to fit in holes provided at the back of the road vehicle.

The platform may further be provided with guiding means convergingly arranged on its both sides. Furthermore, said loading platform may be equipped with a first conveying mechanism countersunk in the floor of said platform, comprising conveying means provided with catches extending above the floor surface of said loading platform and adapted to catch the loading units standing on the loading platform. It also proved to be advantageous if the loading platform further is provided with a second conveying mechanism submersibly attached to the floor of said loading platform, said second mechanism comprising a ram liftable out of the floor of said loading platform and adapted to rest against the back sides of the loading units to push them into the road vehicle.

Such an installation serves in the most rational possible way, that is with the smallest expenditure of time and service personal, to load a lorry with a number of mobile loading units. Such a loading unit may, for example, comprise a great number of small piece goods stacked on a pallet, the latter, in turn, resting on a trolley.

Usually the lorries which are to be used for the transport of palletized loads are adjusted in their load space measurements to the internationally useable standard pallet. Usually the width of the load space is just enough to accomodate two pallets side by side, whereby only a minimal clearance space between the wall and the pallet load remains free.

It is thus important, on the one hand, to make sure that the clusterwise loading of the vehicle, that two sideways of adjacent pallets will be carried into the loadspace and are drawn as closely together as possible, and on the other hand, that no sideways projecting part of the load is present which could be caught on the loadspace wall of the vehicle and thereby impair the loading procedure. Especially in the case of light piece goods stacked on pallets it often occurs that during the transport within the warehouse the load shifts which requires time consuming corrections.

In the case of an installation of the above mentioned kind, this is achieved in the invention by providing the platform with a portal-like load centering device disposed at its vehicle facing end which device exhibits centering plates disposed parallel to each other on both sides of the platform, which plates are driven in an oppositely moving oscillating manner.

BRIEF DESCRIPTION OF THE DRAWINGS

In the following, there will be described, by way of example only, a preferred embodiment of a loading installation according to the present invention, with reference to the accompanying drawings, in which:

FIG. 4 shows a section through the load centering device.

FIG. 5 is an enlarged vertical sectional view taken on the line 5—5 of FIG. 4;

FIG. 6 is a fragmentary vertical sectional view taken on the line 6—6 of FIG. 3; and, FIG. 7 is a horizontal sectional view taken on the line 7—7 of FIG. 2.

DESCRIPTION OF THE PREFERRED EMBODIMENTS

Figure 1:
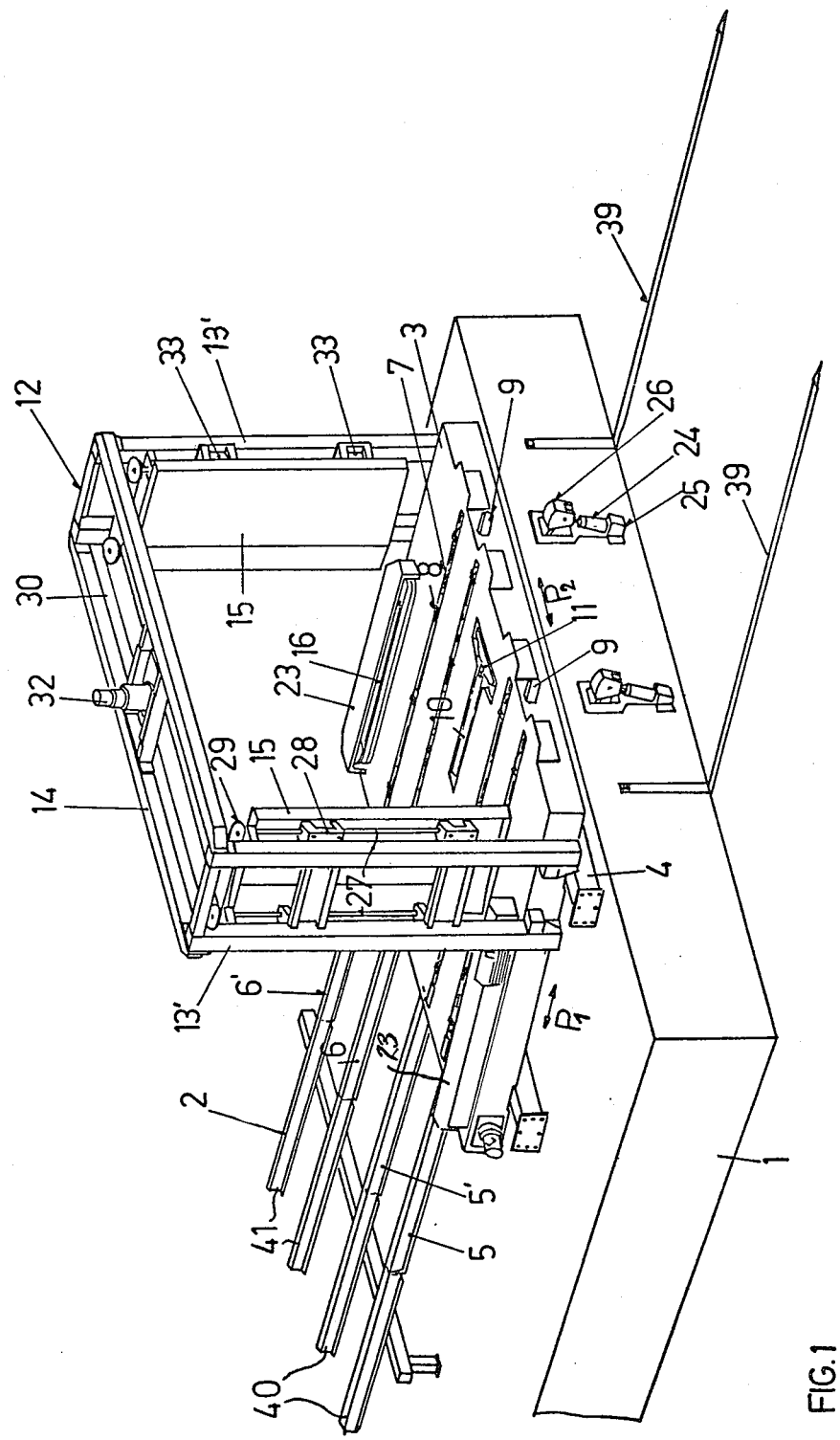
FIG. 1 shows an overall perspective view of the whole installation.

In FIG. 1, there can be seen a section of the loading ramp 1 with the end of a rail track generally designated with reference numeral 2. The fixed rail track 2 mounted on a support 2a can be seen to consist of two pairs of parallel running rails 40 and 41. The rail track 2 is inclined towards its end. A stopping mechanism, not shown in the drawings, is provided at the end of the rail track preventing the loading units from running over the end of the rails 40 respectively 41.

In the region of the front edge of the loading ramp 1, there is provided a loading platform, generally denoted with reference numeral 3. This loading platform and its movable rail pairs 5, 5', 6, and 6' rest on carriers 4 these carriers and rails being mounted on the floor of the loading ramp 1. The platform 3 is displaceable in the direction of the double arrow $P_1$ on FIG. 1, which displacement is better shown in FIG. 3 and, at the same time, also in the direction of the arrow $P_2$, also in FIG. 3, thus enabling a displacement parallel and perpendicular to the edge of the ramp 1 and to the fixed end of the rail track 2. A vertical displacement could be achieved by means of the hydraulic driving means 60 (FIG. 1) mounted below the platform 3. This being a well known mechanism in the art removes the need for a more explicit explanation nor to show it in greater detail in the drawing.

The connection between the railtrack 2 and the loading platform 3 is accomplished by means of connecting rail members on the platform denoted 5, 5' and 6, 6'. Each of these rail members is, at it's one end, movably connected to the end of one of the rails 40 respectively 41 and in longitudinal alignment therewith. Their other ends are adapted to rest against the surface of the loading platform 3. As can be seen from FIG. 3, the rail members converge towards the platform 3 up to a minimal distance between each other given by the maximal width of the loading units.

Figure 2:
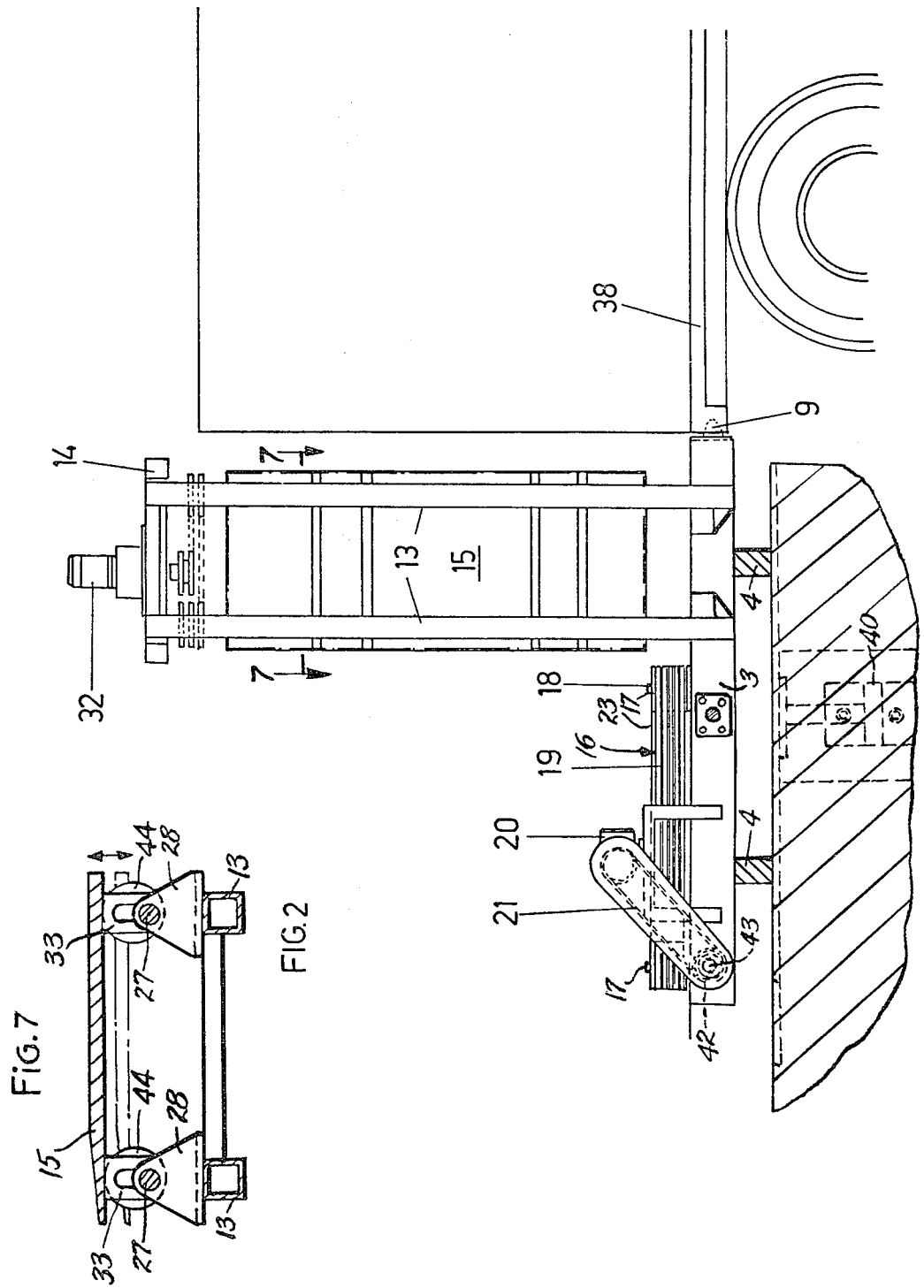
FIG. 2 shows a partial view from the side.
Figure 3:
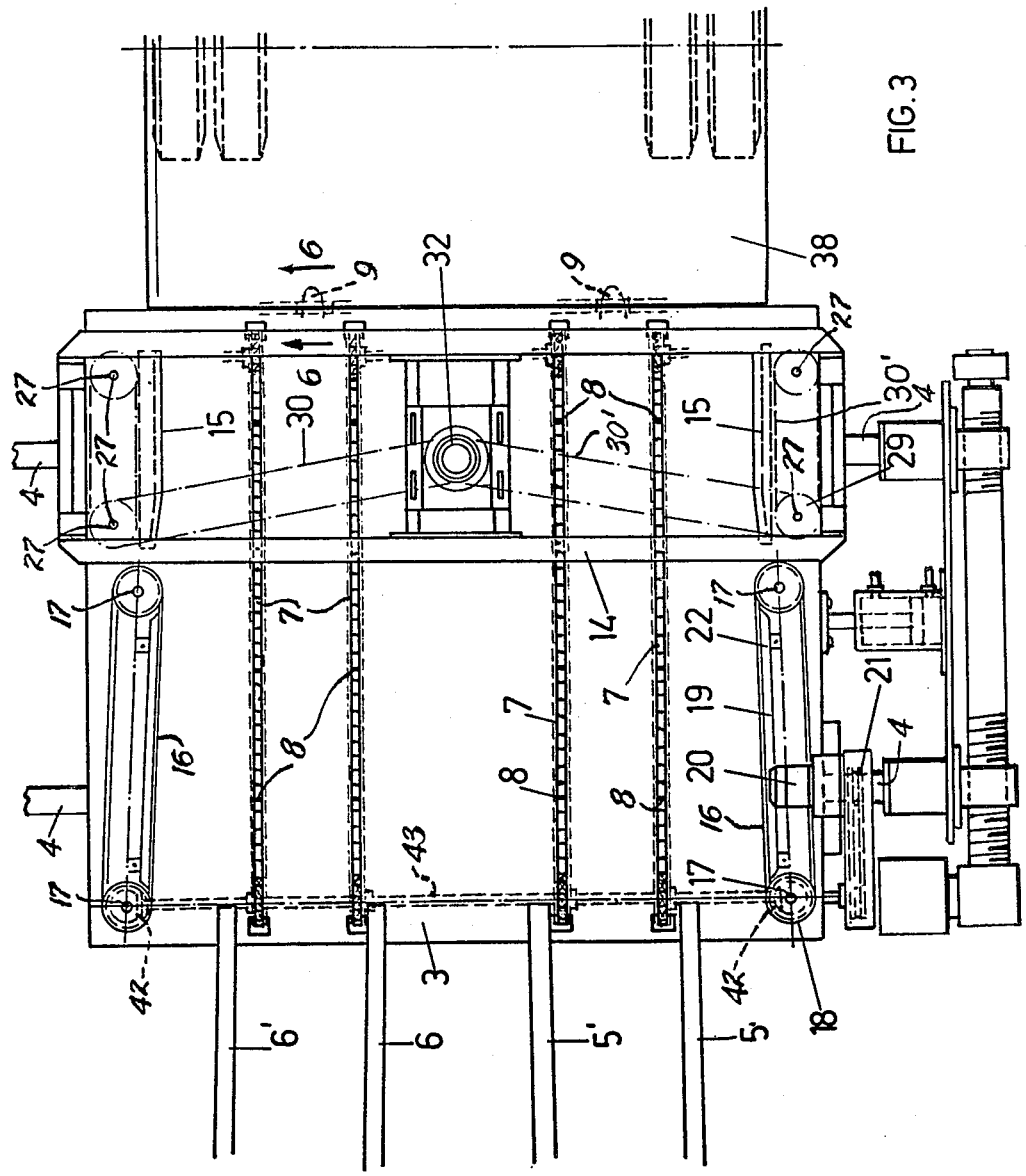
FIG. 3 shows a partial view from above.

On both sides of the platform 3 and as shown in FIGS. 1, 2 and 3, there are provided guiding means 16, extending along the sides of the platform 3 to the edge of the platform 3 and being arranged slightly converging, thus guaranteeing a minimal distance between the loading units 37 shown in FIG. 4 on the platform 3 for delivery to the vehicle 38 (see FIG. 2).

The platform 3 is further provided with a first conveying mechanism, chain loop means 7 shown in FIGS. 3 and 5 for transporting the loading units 37 along the platform. The conveying mechanism in the present preferred embodiment comprises two pairs of parallel running chain loops 7, the chains being equipped with catches 8 (see FIGS. 3 and 5). The distance between the two pairs of chain loops 7 again is given by the width of the loading units 37, while the distance between the individual loops of a pair of chain loop means 7 is, of course, smaller than the track gauge of the trolleys 36 on which the loading units rest. The catches 8 are meant to interact with the trolleys 36 as shown in FIGS. 4 and 5 and effect in this way a conveying of the loading units towards the road vehicle.

The front side of the platform 3, which faces the edge of the ramp 1, is provided with two springy centering studs 9, adapted to fit into holes provided in the back of the truck 38 to be loaded and is best viewed in FIGS. 3 and 6. These studs 9 can be pressed into the platform 3. If the position of the platform 3, with respect to the position of the truck 38, is correct, the studs 9 snap out under the influence of their springs 41 shown in FIG. 6 which snap the stud 9 into the holes in the back of the truck 38 and thereby assures positive alignment and connection.

The platform 3 is further provided with a push-in cylinder arrangement 10, shown in FIGS. 1 and 5 which is submersibly attached to the floor of the platform 3. A ram 11 is connected to the piston of the cylinder arrangement 10 and can be extended in the direction towards the truck to push a couple or a cluster of loading units as shown in FIG. 4 into the truck 38.

As illustrated in FIGS. 1, 3 and 4, a load centering device, designated generally by 12, is disposed at the end of the platform 3 far from the trackway 2. It comprises two lateral supporting members 13 and 13' and a cross beam 14. Centering plates 15 shown in FIGS. 1 and 7 are mounted at the lateral supports 13 and 13' which plates are arranged against the portal constituted by the supports 13, 13' and the beam 14 and which thereby assume a substantially parallel position with respect to each other. The centering device 12 is explained in greater detail further below.

As best shown in FIGS. 1 and 3, guiding members 16 are provided on both sides of the platform. These two guiding members 16 run, as shown in FIG. 3, convergently towards the portal-like centering device 12 and each comprises, two pulleys 18, rotatable around a vertical axle 17 and disposed at a distance from one another and around each of the pulleys 18 is disposed a number of endless guiding belts 19. Driving power for these belts 19 is then provided by means of an electric motor 20 shown in FIGS. 2 and 3 which is coupled with the axle 17 of one of the trolleys 18 through transmission means 21. The same electric motor 20 serves also to drive the chain loops 7 whereby the gear-ratio in the transmission means 21 is chosen to synchronize the motion of the catches 8 and the belts 19 at the same velocity utilizing the gear train 12 and shaft 43.

As can be seen in FIG. 3, support plates 22 are provided which support the oppositely arranged parts of the endless belts 19. In FIG. 1, one can see that the guiding means 16 are covered by caps 23 to prevent the entrance of undesired foreign bodies to expose the belt structure.

The front side of the loading ramp 1 is provided with two support means for the loading rear portion of the lorry or loading vehicles which means comprise, a piston cylinder unit 24 which is mounted upon a projection 25 and comprises a displaceable support head 26, which support head is positionable against the underside of the rear of the lorry. Both hydraulic cylinders 24 are individually adjustable under pressure in order to permit a correction for an obliquely standing lorry or vehicle.

Further details concerning the construction of the load centering device 12 can be seen from FIG. 4. Vertically running shafts 27 are mounted rotatably at the two lateral supports 13, 13' by means of bearing blocks 28. A driving wheel 29 is mounted at the upper end of the shaft 27, which wheel is connected through suitable transmission means 30 to a driving wheel 31 of an electric motor 32, which motor is supported in the middle of the crossbeam 14. It is evident from FIG. 3 that all in all four shafts 27 are provided, two on each side. Each of the shafts 27 is provided with at least one driving wheel 29. The transmission of power from the motor 32 is effected by the transmission chain or belt means 30 to one of the shafts on both sides, and is efficient on the other shaft 27 by means of the transmission chain or belt means 30'.

Each of the four shafts 27 is provided with an eccentric 44 (FIG. 7) between the two arms of the bearing block 28, and each of the eccentrics 44 is surrounded by a casing 33. These casings 33 are fastened to the rear faces of the centering plates 15 and serve for the supporting and driving of the centering plates. By rotation of the shafts 27 (see FIG. 7), the centering plates 15 move in an oscillating motion in which each vertical line on the plate 15 moves on the surface of a circular cylinder. The two plates 15 are thereby driven in a contrary or opposite sense in respect to each other, so that they move alternatively towards each other and away from each other and at the same time oscillating in the direction of the load. The driving speed of the shafts 27 is so chosen that the velocity of the oscillation in the direction of the load equals the velocity of the chain loops 7.

In FIG. 4, for purposes of clarification, two loading units generally designated by 34 are illustrated. They comprise a pallet 35 which lies on a trolley 36 and which is loaded with goods 37.

A loading procedure with the above described installation proceeds as follows:

A cluster of loading units provided for loading stands ready at the end of the trackway 2.

A lorry drives backwards to the ramp 1 whereby marking lines 39 are provided to determine the approximate position of the lorry. The platform 3 is put back somewhat from the edge of the loading ramp. As soon as the lorry has docked the support means 24, 26 are activated and bring the lorry bridge into a horizontal position. Furthermore they hinder a sinking of the bridge with increasing load. The platform is then moved towards the lorry and moved sideways and in height until the centering studs 9 have engaged the correspondingly provided centering holes as the rear of the lorry.

Now the actual loading procedure can begin. First, the stopping mechanism at the end of the trackway 2 is released and the loading units begin, as a consequence of the slope, to roll towards the platform. By the convergently running connecting rail members 5, 5' resp. 6, 6' the loading units come closer together. As soon as they have reached the platform 3, the catches 8 engage the trolleys 36 and push the loading units into the lorry. At the same time the loading units are aligned and shoved once more together, this under the action of the guiding members 16. An alignment is especially necessary when the position of the trackway 2 and the platform 3 differ greatly, i.e. as soon as the angle between the rails and the connecting rail members 5, 5' resp. 6, 6' is relatively large.

The loading units then come into the range of action of the loadcentering device 12, the plates 15 of which engage still projecting goods and push them smoothly back into place. As a consequence of the equal velocity of the loading units 34 and the plates 15, the velocity difference between the goods 37 and the plates 15 in the loading direction is equal to Zero so that only the motion of the plates running perpendicular to said loading direction has any effect. An unwanted displacement of the load is thereby prevented.

As soon as the last two loading units are halfway on the load bridge of the lorry they leave the range of action of the chainloops 7 and the catches 8. At this point, the pushing cylinder 10 is activated, i.e. extended from its sunken position and the stud 11 is brought into position against the last loading unit. A further displacement of the stud produces a complete driving in of the whole cluster of loading units into lorry where it is secured against shifting. The loading procedure is thereby finished and the lorry can move on.

The foregoing described installation permits the complete loading of a truck in the shortest possible time. Only one service person is rquired to carry out and terminate the loading procedure and the accurate positioning of the truck is not needed anymore, in that a relatively large displacement may be compensated. The danger of a damaging or a slipping, resp. falling of the load is completely excluded and it is guaranteed that the up to now most critical process in the flow of goods can be conducted rationally and largely automatically.

For closing, it shall be mentioned that this arrangement is just as suitable for unloading of road vehicles. It is evident that in this case a suitable arrangement for the extraction of the loading units must be provided, that is, until these loading units would reach the effective range of the catches on the chain loop provided on the platform.

For the loading of a two level lorry, the platform 3 may be equipped with a lifting apparatus. Of course the rail members 5, 5' and 6, 6' have to be removed before lifting the platform 3. Besides that, the loading procedure corresponds exactly to that described above.

What we claim is:
1. An installation for loading a road vehicle with loading units which is positioned at an exit of a warehouse on an inclined rail track, comprising:
   a loading platform supported on a rail track loading ramp at the end of said exit of said rail track;
   said loading platform being displaceably supported on lifting means to lift said platform relative to said loading ramp and also relative to said exit end of said rail track;
   a first conveying mechanism countersunk in the floor of said loading platform comprising conveying means provided with catches extending above the floor surface of said loading platform and adapted to catch the loading units standing on the loading platform;
   a second conveying mechanism submersibly attached to the floor of said loading platform comprising a ram liftable out of the floor of said loading platform into a working position and adapted to rest against the back sides of the loading units to push them into the road vehicle;
   a number of rail members connecting said end of said rail track to said loading platform;
   each of said rail members being movably connected to the end of said rail track with their one end in alignment while their other end is adapted to rest on the surface of said loading platform;
   said rail members being arranged so as to converge from a distance between each other given by the arrangement in the warehouse to a minimal distance given by the width of the loading units;

said loading platform comprising conveying means for conveying clusters of said loading units from said loading platform into the road vehicle.

2. An installation according to claim 1, in which the loading platform is displaceable in a parallel direction as well as in a perpendicular direction to the front side of said loading ramp.

3. An installation according to claim 1, in which the loading platform is provided with spring-loaded centering studs arranged on the front side of said loading platform facing the front edge of the ramp, said centering studs being adapted to fit in to holes provided at the back of a road vehicle.

4. An installation according to claim 1, in which the loading platform further is provided with guiding means convergingly arranged on both sides of said loading platform.

5. An installation according to claim 1, in which the loading platform includes a load centering device disposed at its's end facing the road vehicle, said centering device comprising two centering plates arranged on both sides of the platform in parallel, vertical planes and further comprising driving means to drive said centering plates to a circular motion in contrary sense while maintaining their parallel position.

6. An installation according to claim 5, comprising conveying means disposed in the floor of said loading platform to convey the loading units from the loading platform through the load centering device into the road vehicle, wherein
the tangential velocity of the driven centering plates is equal to the conveying velocity of the driven conveying means.

7. An installation according to claim 5, comprising guiding means arranged on both sides of the loading platform and having guiding elements revolving along the sides of the loading platform, wherein the tangential velocity of the driven centering plates is equal to the speed of revolution of the driven guiding elements.

8. An installation according to claim 5, in which each of the two centering plates are mounted on rotatable shafts eccentricly mounted to drive the plates to a circular motion.

9. An installation according to claim 5, in which the forward side of the loading ramp is provided with supporting means for supporting the bridge of a road vehicle.

10. An installation according to claim 9, in which said supporting means comprise cylinder-piston units equipped with a supporting haed, the latter being moveable out of the cylinder to rest against the underside of the bridge of a road vehicle.

11. An installation according to claim 10, in which there are provided two cylinder-piston units each equipped with a supporting haed, these units being arranged besides each other in a certain distance and may be activated individually for correcting an oblique position of a road vehicle.

12. An installation according to claims 6, wherein the conveying means and the guiding means are driven by a common motor.

13. An installation according to claim 9, in which the guiding means comprise two rollers each, rotatably arranged on a vertical axle in a certain distance from each other, and a number of endless belts surrounding said two rollers to form the revolving guiding elements, the part of each guiding belt directed against the center of the platform lying against a supporting plate.

* * * * *